CRYOGENIC COMPUTING DEVICES

Filed April 3, 1957 3 Sheets-Sheet 1

INVENTOR.
DUDLEY A. BUCK
BY KENWAY, JENNEY, WITTER & HILDRETH
ATTORNEYS

INVENTOR.
DUDLEY A. BUCK
BY KENWAY, JENNEY, WITTER & HILDRETH
ATTORNEYS

Dec. 5, 1961 D. A. BUCK 3,011,711

CRYOGENIC COMPUTING DEVICES

Filed April 3, 1957 3 Sheets-Sheet 3

INVENTOR.
DUDLEY A. BUCK
BY KENWAY, JENNEY, WITTER & HILDRETH

ATTORNEYS

United States Patent Office 3,011,711

Patented Dec. 5, 1961

3,011,711

CRYOGENIC COMPUTING DEVICES

Dudley A. Buck, North Wilmington, Mass., assignor to Research Corporation, New York, N.Y., a corporation of New York Filed Apr. 3, 1957, Ser. No. 650,410
15 Claims. (Cl. 235—176)

The present invention relates to computers and computer elements and more particularly to apparatus using gating devices of the type described in my Patent No. 2,832,897, granted April 29, 1958, and now known as cryotrons.

The cryotron gating element involves the phenomenon of superconductivity in that a conducting wire, preferably of tantalum is maintained at a temperature to cause superconductivity by immersion in liquid helium, and is rendered resistive by a magnetic field created by control wire wound thereon. As described in my above cited application, the control wire is preferably of niobium which maintains its superconducting properties in the presence of its own magnetic field.

The object of the present invention is to provide certain computers and computer elements which make use of the advantages of cryotron gating elements.

Figure 1:
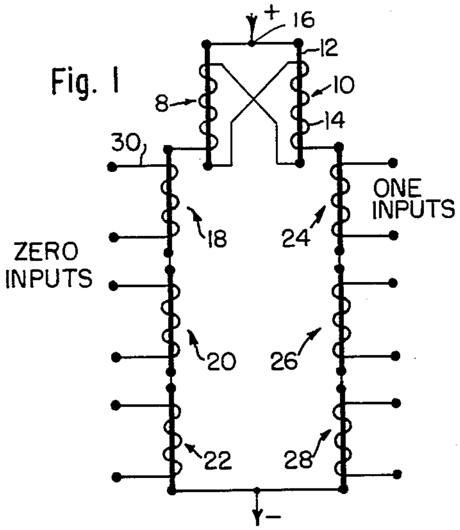
FIG. 1 is a diagram of a flip-flop with means for multiple gating.

The apparatus shown in FIG. 1 is a flip-flop or bistable circuit having multiple inputs. As described in the above-identified patent, the flip-flop comprises two cryotron circuit elements 8 and 10, each consisting of a center wire 12 and a control wire 14 mounted thereon. The center wire 12 is preferably of tantalum and the control wire 14 preferably of niobium. The source of current is connected to both of the center wires of the two elements as indicated at 16. The other end of each center conductor is connected to the control winding of the other element.

The control winding of element 8 is connected to the center conductors of three "zero" input cryotron units 18, 20 and 22, while the control winding 14 is connected in series with the center conductors of three "one" input cryotrons 24, 26 and 28 which in turn are connected to the current supply 16. The input cryotrons constitute "setting" devices as described in my copending application for determining current flows in the flip-flop. There may be any number of "zero" inputs and any number of "one" inputs connected in series. Each of the input cryotron units is provided with a control winding which for the unit 18 is shown at 30.

Sizes and types of wire are preferably as described in the copending application. In each case the center element may be of .003 diameter and the control winding of .001 diameter wire. The entire circuit is immersed in liquid helium to maintain the temperature at about 4.2° K.

In operation it is assumed that current is established in one branch or the other. Thus the operation may be started with current flow through the right-hand cryotron 10 of the flip-flop by energizing any one of the "zero" inputs 18, 20 and 22. In that case the normally superconducting path through the center conductors of the left-hand inputs will have been made resistive by the magnetic field due to any one of the energized control windings of the selected input. This means that no current will flow through the control winding of 8 or the center conductor of 10. Hence superconduction occurs in the center conductor of 8, the control windings of 10, and all of the "one" input cryotrons; this stores the zero condition in the flip-flop. This condition will persist even after the current is cut off from the energizing winding of the selected "zero" input.

To shift conduction it is only necessary to energize one of the "one" inputs 24, 26 and 28. As described in the copending application, the preferred magnitude of the setting current to cause a shift is somewhat less than twice that necessary to destroy superconductivity in its own branch.

It will be observed that the inputs 18, 20, 22 and 24, 26, 28 are OR gates in that energization of any one of the "zero" inputs or energization of any one of the "one" inputs will under appropriate conditions cause a shift of the flip-flop.

Figure 2:
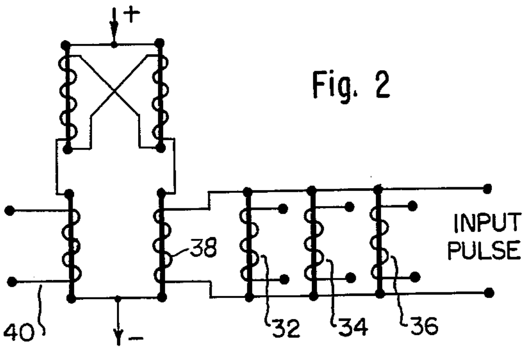
FIG. 2 is a diagram of a cryotron flip-flop with multiple inputs arranged for a different type of operation.

The flip-flop in FIG. 2 is provided with AND gates for the "one" input in parallel with the control winding of an input cryotron. Each of the gates 32, 34 and 36 is a cryotron and the several units are connected in parallel. The set current which would operate the flip-flop is bypassed from the input unit 38 unless all of the parallel gates 32, 34 and 36 are made resistive, which means that all three of these units must have their control windings energized.

The "zero" input cryotron 40 is shown as having only a single input, but similar AND–OR arrangements may be used depending upon the computations to be performed.

It is usually necessary to provide a sensing cryotron to detect which branch of the flip-flop is superconducting and which is resistive. The sensing cryotron is not shown herein since such sensing devices are fully disclosed in my copending application.

Figure 3:
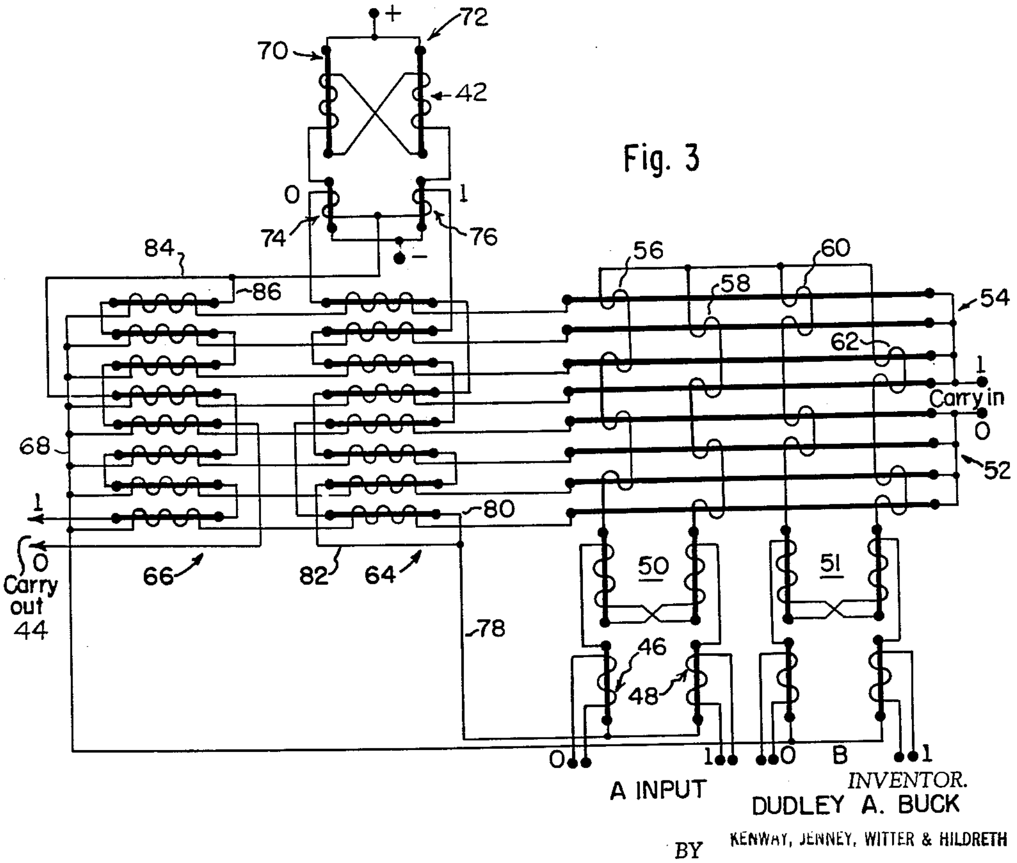
FIG. 3 is a diagram of a single stage of a binary adder.

In FIG. 3 I show a binary adder employing cryotron units. The adder is in a single stage and is for the purpose of adding two binary digits. There are three inputs designated "A" input, "B" input and "carry-in." In keeping with binary adder stages it is necessary to indicate the sum and it is also necessary to indicate whether the carry to the next stage is 0 or 1. Hence there is provided a sum flip-flop 42 and a carry output 44. The adder operates according to the following binary addition table:

| Input A | Input B | Carry In | Sum | Carry Out |
|---|---|---|---|---|
| 1 | 1 | 1 | 1 | 1 |
| 0 | 1 | 1 | 0 | 1 |
| 1 | 0 | 1 | 0 | 1 |
| 0 | 0 | 1 | 1 | 0 |
| 1 | 1 | 0 | 0 | 1 |
| 0 | 1 | 0 | 1 | 0 |
| 1 | 0 | 0 | 1 | 0 |
| 0 | 0 | 0 | 0 | 0 |

The "A" input comprises two cryotrons 46 and 48, each having the usual center conductor and control winding. The control winding of the unit 46 is adapted to be energized for a "zero" input and the control winding of element 48 for a "one" input. Associated with the "A" input is a flip-flop 50 comprising two cryotrons with the center conductor of each connected with the control winding of the other. The center elements of the units 46 and 48 are connected in series with the control windings of the corresponding flip-flop units. The "B" input is identical with the "A" input and has a flip-flop 51.

Above the input devices are two four-position cryotron matrix switches which are of the general form shown in FIG. 13 of my copending application. The bottom four-position switch 52 comprises four cryotron elements, each of which has two windings thereon while the upper four-position switch 54 is similarly constructed.

Connected in series with the left-hand cryotron of the flip-flop 50 are four windings 56 wound on the second and fourth cryotron elements of the switches 52 and 54. The right-hand center conductor of the flip-flop 50 has windings 58 wound on the first and third elements of each switch. The left-hand element of the flip-flop 51 of the "B" input has windings 60 on the third and fourth elements of each switch, while the right-hand cryotron of the flip-flop 51 is connected to windings 62 which are on the first and second elements of each switch.

The "zero" carry input is connected to the center conductors of the four cryotron units of the switch 52 while the "one" carry input is connected to the center conductors of the switch 54.

The switch conductors are connected with two sets of cryotrons, namely, a set of sum cryotrons 64 and a set of carry-out cryotrons 66 which are connected in a manner to accomplish the results set forth in the above binary addition table. Each set comprises eight cryotrons having the usual center conductor and control windings. Each center conductor of the switch elements 52 and 54 is connected to the control windings of the corresponding cryotrons of the sets 64 and 66 in series. All of these connections terminate in a single connection 68 which runs to the center conductors of the "B" input cryotrons.

The sum flip-flop 42 comprises the flip-flop cryotrons 70 and 72 and the "zero" set cryotron 74 and the "one" set cryotron 76 connected in the same manner as in FIG. 1.

A connection 78 runs from the center conductors of the two cryotrons 46 and 48 of the "A" input to two conductors 80 and 82. The conductor 82 leads through the center conductors of the first, fourth, sixth and seventh of the center conductors of the set 64 all in series and finally to the "one" set coil of the flip-flop 76, while the conductor 82 leads in series through the second, third, fifth and eighth of the center conductors of the cryotrons of the sum set 64 to the control winding of the "zero" set cryotron 74. The two control windings of the cryotrons 74 and 76 are connected together and thence are connected to conductors 84 and 86. The conductor 84 leads in series through the fifth, third, second and first center conductors of the cryotrons of group 66 to the "one" carry-out terminal while the conductor 86 leads in series through the center conductors of group 66 in the eighth, seventh, sixth and fourth positions to the "zero" carry-out terminal.

From the descriptions heretofore given and the table above it can be seen that the operations as set forth in the table are effected in accordance with the inputs. Thus suppose, as an example, that the operation designated in the third row of the table is to be carried out; namely, $A=1$, $B=0$, carry-in$=1$. For the "A" input the unit 48 is made resistive. This keeps current out of the control winding of the right-hand element of flip-flop 50 and hence current flows through the windings 58 of the switches 52 and 54. For the "B" input, the windings 60 of the switches are energized. This means that the second element from the bottom of switch 54 and the second element from the bottom of switch 52 remain superconductive while the other elements are resistive. Since the carry-in is "one," only the second conductor of 54 carries current. Thus current flows only through the control windings of the sixth elements of both groups 64 and 66, rendering them resistive and preventing conduction through paths 80 and 86. Conduction is thus permitted through path 82 with the result that the "zero" condition of the sum flip-flop 42 is assumed.

For the carry-out circuit path 86 is resistive, and hence current flows through path 84 to conduct current to the "one" carry-out terminal.

Figure 4:
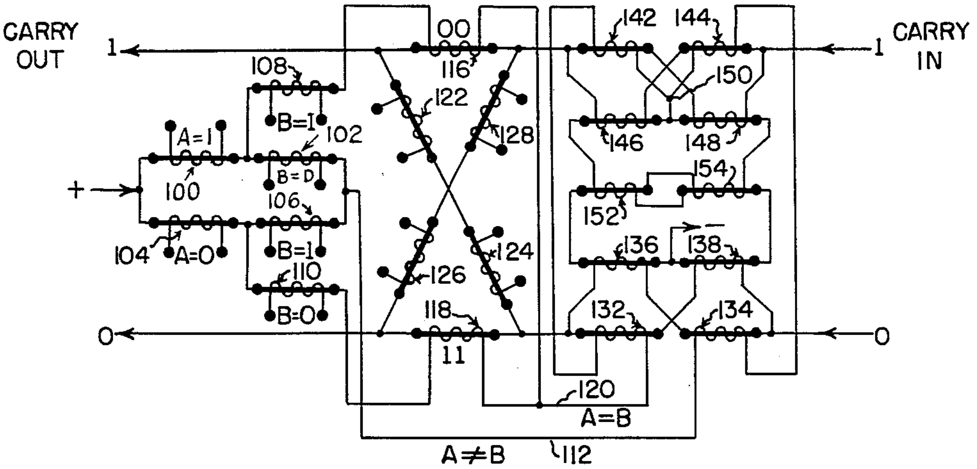
FIG. 4 is a diagram of another type of binary adder.

The circuit shown in FIG. 4 is also a binary adder stage which is somewhat simpler in its arrangement than that of FIG. 3. This utilizes a carry network, which is of lattice form shown in FIG. 5.

From the above table it will be seen that certain carry operations are performed depending on whether $A=B$ or $A\neq B$. The carry lattice of FIG. 5 takes advantage of this principle.

There are two cryotrons for $A=B$, one being energized when they are both equal to 0, shown at 116, and one where they are both equal to 1 shown at 118. The "0" carry-in terminal is connected through the conductor of 118 to the "0" carry-out terminal while the "1" carry-in terminal is connected through 116 to the "1" carry-out terminal. A diagonal connection involving two cryotrons 122 and 124 runs between the "1" carry-out terminal and the "0" carry-in terminal. These cryotrons have control windings which are respectively energized for $B=0$ and $A=0$. Similarly, a diagonal connection involving two cryotrons 126 and 128 is made between the "0" carry-out and the "1" carry-in for $B=1$ and $A=1$ respectively. The two diagonal connections and the cryotrons 116 and 118 form the carry lattice.

When $A=B=0$ cryotron 116 is resistive as is also the diagonal connections 122 and 127. Under such conditions the carry-out is "0" whether the carry-in is "1" or "0"; hence, the paths through 118 and through 126 and 128 are both conductive. When $A=B=1$, path 118, paths 126 and 128 are resistive and current flows to the "1" carry-out terminal from either carry-in terminal. When $A\neq B$ the carry-out is equal to the carry-in. Under these conditions both of the diagonal paths are resistive and both paths 116 and 118 are conductive so that direct connections are provided between corresponding carry-in and carry-out terminals.

In the complete binary adder stage of FIG. 4, there is a four-position binary switch comprising two gating elements 100 and 102 with their center conductors connected in series for $A=1$ and $B=0$, and another pair 104, 106 for $A=0$, $B=1$. A gating element 108 with its center conductor connected to the junction of 100 and 102 is provided for $B=1$, and another element 110 is connected to the junction of 104 and 106 for $B=0$. The units 102 and 106 are connected together to a wire 112 designated $A\neq B$, further connections of which will be described later.

It will be seen that the units 100 to 110 constitute a four-position binary switch wherein a selection is made for A equal to either 1 or 0 and B equal to either 1 or 0. The conductor of unit 108 is connected to the control winding gating element 116 of the carry lattice. This winding is designated 00 to mean that $A=B=0$. The conductor of gate 110 is connected to the control winding of the element 118, which is designated 11 to mean that $A=B=1$. The control windings of 116 and 118 are connected together into a circuit 120 designated $A=B$.

The $A=B$ and $A\neq B$ currents are also used to control the sum flip-flops. This depends on the principle that if $A=B$, the sum equals the carry-in, but if $A\neq B$ the sum is the binary complement of the carry-in. The $A=B$ and $A\neq B$ currents are used to route the carry input currents to the proper side of the flip-flop.

The "0" carry-in terminal is connected to the "0" lattice terminal 130 through two parallel paths, one of which is always superconductive. The two paths involve the cryotrons 132, 134, 136 and 138. One path leads through the conductor of 134 and the control winding of 136, while the other leads through the control winding of 138 and conductor of 132.

Similarly the "1" carry-in terminal is connected to the "1" lattice terminal 140 through two parallel paths, namely, one path through the conductor of 144 and the winding of 142, and the other path through the winding of 148 and the conductor of 142. Thus the carry lattice is free to operate in the manner described for FIG. 5 regardless of the energization of the cryotrons 132, 134, 142 and 144.

The $A=B$ current in line 120 runs through the control windings of cryotrons 132 and 142 in series, and $A\neq B$ in line 112 runs through the control windings of 134 and 144 in series. The two lines join at 150 and connect with the conductors of 146 and 148. A bistable element comprising two cryotrons 152 and 154 is provided. From 150 there are two parallel circuits leading to one side of the supply. One circuit comprises the conductor of 146, the winding of 152, the conductor of 154 and the conductor 138, while the other comprises the conductor of 148, the winding of 154, the conductor of 152 and the conductor of 136.

The cryotrons 136, 138, 146, 148, 152 and 154 comprise the sum flip-flop with its setting coils.

If $A=B$, gates 132 and 142 are closed. If the carry-in is zero, the carry-in current closes gate 136 and leaves 138 open. The $A=B$ current therefore finds one of the above-described paths through conductors 154 and 138. This is the zero sum condition. On the other hand, if the carry-in is one, gate 146 is closed and 136 is open so that the path leads through the conductors of 152 and 136, which is the "one" sum condition.

If $A\neq B$, gates 134 and 144 are closed, and the $A\neq B$ current is routed in accordance with the carry-in to give the proper sum.

Figure 6:
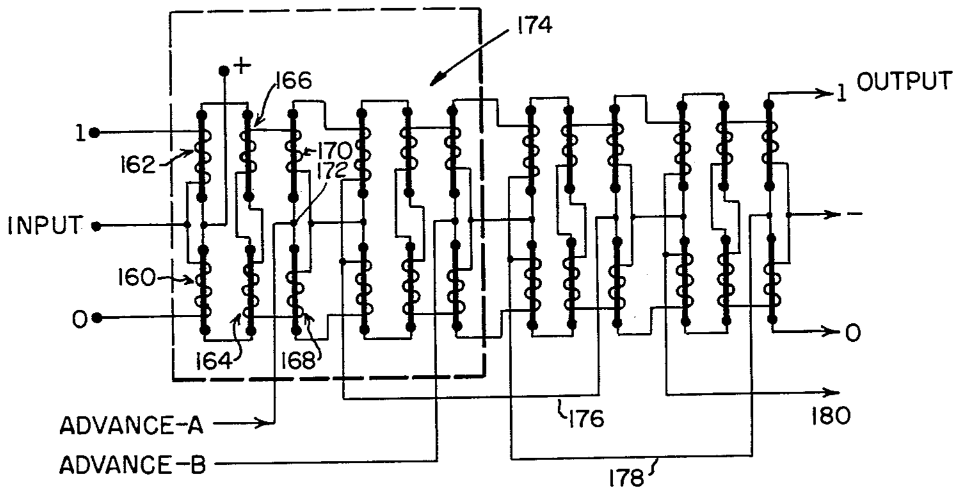
FIG. 6 is a diagram of a stepping register.

A two-stage stepping register using cryotrons is shown in FIG. 6. Each stage comprises two flip-flops with input and output cryotrons. The first stage is shown enclosed in dash lines, and the second stage is identical.

The input cryotrons are shown at 160, 162 for "0" and "1" inputs respectively. They control the bistable circuit made up of cryotrons 164, 166 in exactly the manner of FIG. 1. Read-out cryotrons 168, 170 are provided, each having its control winding in series with the control winding of 164 and 166, respectively. As described in my copending application, a read-out pulse introduced at 172 will choose a path through the center conductor of either 168 or 170 depending on the state of the flip-flop.

Pulses designated advance-A are introduced at 172. The conductors of 168 and 170 are connected to the input windings of a second flip-flop 174 identical with the parts thus far described. The result is that an "0" or "1" pulse fed in at the left, will upon occurrence of a subsequent advance-A pulse set the condition of the flip-flop 174 to correspond to the input pulse. An advance-B pulse may be fed in to the read-out gates of the second flip-flop, to step the information from the first stage into the input of the second stage.

The input to the second flip-flop of the first stage is fed by a connection 176 to the read-out gates of the first flip-flop of the second stage in the same manner as the advance-A pulse is applied in the first stage. The input to the second stage is also fed through a connection 178 to the final read-out gates of the second stage.

In preferred operation the advance-A and advance-B pulses are displaced in time, and the input pulses to 160, 162 are synchronized with the advance-B pulses. Thus the information fed into the first flip-flop will advance through the one stage of the register for each pair of A and B pulses.

Figure 5:
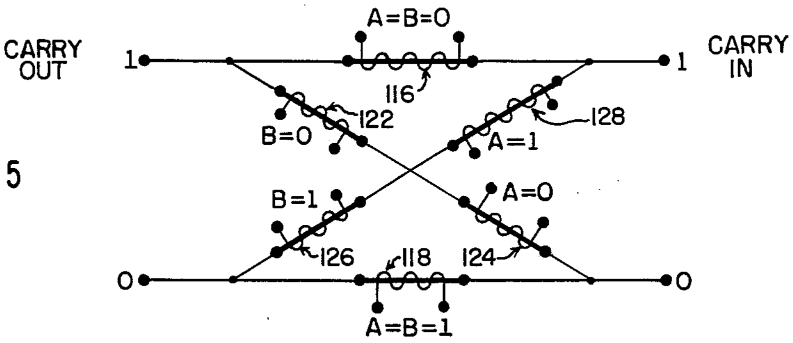
FIG. 5 is a diagram of a carry-network.

In order to avoid complications in the drawings not all of the connections are shown. Thus, the current supply to the system is conventionally indicated by plus and minus signs, although it will be understood that polarities are not usually important. In FIG. 5, the energization of the various coils for $A=0$ or 1 and $B=0$ or 1 may be considered to be accomplished by simple manually controlled connections for the several coils, although in practice the coils would preferably be energized from flip-flops, as in the use of the A and B input flip-flops of FIG. 3.

Having thus described the invention, I claim:

1. A computer comprising a plurality of cryotron gating elements, digit inputs, a sum flip-flop, carry-in means to introduce "0" and "1" carries, cryotron matrix switch means connected with the carry-in means, control means for the sum flip-flop, a bank of cryotrons having selected conductors connected in a path to one side of the flip-flop, and the remaining conductors connected to the other side of the flip-flop, carry-out means to carry-out "0" and "1" carries a bank of cryotrons having selected conducting paths to said "0" and "1" carry outputs, and means controlled by the carry inputs and the digit inputs for controlling the matrix switch means to control conduction through said banks to control energization of the flip-flop and the carry outputs.

2. A control circuit for a gating device, said gating device comprising a gate conductor adapted to transfer to a resistive state from a normally superconductive state dependent upon the magnetic field in the near vicinity of said gate conductor and a superconductive control conductor associated with said gate conductor and adapted when sufficient current is passed therethrough to create said magnetic field and cause transition of said gate conductor to its resistive state, said control circuit being interposed in parallel between said control conductor and a current source therefor and comprising a plurality of control locations, each of said control locations including a normally superconductive path connected in parallel with said current source and control means associated with said superconductive path for rendering said superconductive path resistive, current from said current source to the control conductor of said controlled gating element being insufficient to cause transition of said controlled gate conductor unless all of said normally superconductive paths in said control circuit are rendered resistive.

3. The combination defined in claim 2 in which each of said control locations includes at least one gating device of the type controlled.

4. The combination defined in claim 2 in which each of said control locations comprises a gating device of the type controlled, the gate conductors of said gating devices being connected in parallel across said current source.

5. A control circuit for a gating device, said gating device comprising a gate conductor adapted to transfer to a resistive state from a normally superconductive state dependent upon the magnetic field in the near vicinity of said gate conductor and a superconductive control conductor associated with said gate conductor and adapted when sufficient current is passed therethrough to create said magnetic field and cause transition of said gate conductor to its resistive state, said control circuit being connected in series between said control conductor and a current source therefor, and comprising a plurality of control locations, each of said control locations including a normally superconductive path, the superconductive path at each location being connected in series with the superconductive paths of other control locations and with said control conductor, control means associated with said superconductive paths for rendering said paths resistive, a normally superconductive circuit connected in parallel with the series combination of said control circuit and the control conductor of said controlled gating element across said current source, whereby insufficient current will flow in the control conductor of said controlled gating element to render it resistive if any one of the superconductive paths of said control circuit are rendered resistive.

6. The combination defined in claim 5 in which each of said control locations includes at least one gating device of the type controlled.

7. The combination defined in claim 5 in which each of said control locations comprises a gating device of the type controlled, the gate conductors of said gating devices being connected in series with each other and with said current source and the control conductor of said controlled gating device.

8. An adding circuit for a pair of digits, said circuit being formed from a plurality of cryotrons comprising in combination, a current source, a first set of normally superconductive leads, said set of leads being connected in parallel across said source, digit input means, carry input means, control means connected to said digit input means and said carry input means whereby only one of said first set of superconductive leads remains in its superconductive state and is connected to said current source by a superconductive path for any combination of digit and carry inputs, a storage register formed from cryotrons, a second set of normally superconductive control leads leading to said storage register, means for supplying current to said register through said control leads, means for selectively rendering said storage control leads resistive dependent upon which one of said first set of superconductive leads remains superconductive, and connected to said current source, a pair of carry out terminals, means for supplying current to said carry out terminals via superconductive leads, and means for rendering one or the other of said last mentioned leads resistive depending on which of said first set of parallel superconductive leads remains superconductive and connected to said current source, the sum of said digits being stored in said storage register, and the presence of a carry out being indicated by which of said carry out terminals is energized.

9. An adding circuit for a pair of binary digits, said circuit being formed from a plurality of cryotrons comprising, in combination, a current source, a first set of normally superconductive leads connected in parallel across said current source, half of said leads being connected to said current source via "1" carry input terminal and the other half of said leads being connected to said current source via a "0" carry input terminal, current flow through each half of said leads thereby depending upon whether said "1" terminal or said "0" terminal is connected to said current source, digit input means, control means connected to said digit input means to render all but one of said parallel superconductive leads connected to each of said carry-in terminals resistive for any combination of digits supplied thereto, whereby only one of said leads remains both superconductive and connected to said current source, a cryotron flip-flop, a pair of normally superconductive control leads for setting said flip-flop, means for supplying current to said flip-flop control leads in parallel, and means for rendering one or the other of said flip-flop control leads resistive dependent upon which lead of said first set of superconductive leads remains superconductive and connected to said current source, a pair of carry out terminals, means for supplying current to said carry out terminals via a pair of superconductive leads connected in parallel with said current supply, and means for rendering one or the other of said carry out leads resistive dependent upon which lead of said first set of superconductive leads remains superconductive and connected to said current source, the sum of said digits being stored in said flip-flop and the presence of a carry being indicated by which of said carry out terminals is energized.

10. A computer for adding binary digits A and B comprising, in combination, digit input terminals for digit A and digit B, a cryotron matrix switch, means connecting the control circuits for said switch to said digit input terminals, said switch having outputs for $A=B$ and $A\neq B$, a carry network having a pair of carry input terminals and a pair of carry output terminals and control terminals associated therewith, means connecting two of said control terminals to said matrix switch and means connecting said control terminals to said digit inputs, a cryotron flip-flop for storing the sum of said digits, a switching circuit for controlling the state of said flip-flop, and means connecting the output of said matrix switch and said carry input terminals to control said switching circuit.

11. The combination defined in claim 10 in which said carry network includes cryotron gating devices connected between each input and output terminal, said diagonal connections including cryotrons, to form a lattice.

12. A carry network for use in the addition of a pair of binary digits which can have the values "0" and "1," comprising, in combination, a pair of carry-in terminals corresponding to a "0" carry-in and a "1" carry-in, a pair of carry-out terminals corresponding to a "0" carry-out and a "1" carry-out, a normally superconductive path between said "1" input and output terminals and said "0" input and output terminals, normally superconductive paths between said "0" input terminal and said "1" output terminal and said "1" input terminal and said "0" output terminal, control means associated with each of said superconductive paths for rendering said paths resistive depending on the value of the digits to be added, said control means rendering the path between said "1" terminals resistive when both of said binary digits to be added are equal to each other and to "0," said control means rendering the path between said "0" terminals resistive when both of said digits are equal to each other and to "1," the path between said "1" input and said "0" output being rendered resistive when either of said digits equals "1," and the path between said "0" input and said "1" output being rendered resistive when either of said digits equals "0."

13. A cryogenic stepping register including at least one stage comprising, in combination, a first cryotron flip-flop circuit, a second cryotron flip-flop circuit, and a first source of current, said flip-flop circuits including an input cryotron gate conductor in series between one terminal of said first current source and each of the cryotrons forming said flip-flop, an input control conductor associated with each of said series gate conductors, energization of said control conductors causing the associated gate conductor to shift from a superconductive to a resistive state, thereby setting said flip-flop for current flow through the flip-flop cryotron not in series with said gate conductor, output cryotron control conductors, means connecting said output control conductors in series between each of said flip-flop cryotron control conductors and the other terminal of said first current source, and a gate conductor associated with each of said output control conductors, means connecting each of said output gate conductors of said first cryotron flip-flop in series between one terminal of a second source of current and the input control conductors of said second cryotron flip-flop circuit, and means connecting the other side of the input cryotron control conductors to the other terminal of said second current source, said first and second sources supplying current to said first and second flip-flop circuits when it is desired to set said first and second flip-flops in accordance with signals applied to said input control conductors.

14. A cryogenic stepping register having a plurality of similar stages each of said stages including, in combination, a first cryotron flip-flop circuit, a second cryotron flip-flop circuit, and a first source of current, said flip-flop circuits including an input cryotron gate conductor in series between one terminal of said first current source and each of the cryotrons forming said flip-flop, an input control conductor associated with each of said series gate conductors, energization of said control conductors causing the associated gate conductor to shift from a superconductive to a resistive state, thereby setting said flip-flop for current flow through the flip-flop cryotron not in series with said gate conductor, output cryotron control conductors, means connecting said output control conductor in series between each of said flip-flop cryotron control conductor and the other terminal of said first current source, a gate conductor associated with each of said output control conductors, means connecting each of said output gate conductors of said first cryotron flip-flop in series between one terminal of a second source of current and the input control conductors of said second cryotron flip-flop circuit, and means connecting the other side of the input cryotron control conductors to the other terminal of said second current source, information being shifted into said first flip-flop of said stages by supplying pulses of current from said first current source, said information being shifted to said second stage by supplying pulses from said second current source.

15. The combination defined in claim 14 in which the first current source associated with said first stage is a non-pulsed current source.

References Cited in the file of this patent

UNITED STATES PATENTS

| | | |
|---|---|---|
| 2,067,443 | Gewertz | Jan. 12, 1937 |
| 2,741,758 | Cray | Apr. 10, 1956 |

| | | |
|---|---|---|
| 2,776,380 | Andrews | Jan. 1, 1957 |
| 2,823,855 | Nelson | Feb. 18, 1958 |

OTHER REFERENCES

Magnetic-Matrix Switch Reads Binary Output, by John W. Bean, Electronics, May 1954, pp. 157–159; A High-Speed Shift Register Using Magnetic Binaries by Max Fishman.

Paper 150, I.R.E. National Convention, March 5, 1952.

Slade et al.: A Cryotron Catalog Memory System, Proceedings of The Eastern Joint Computer Conference (Dec. 10–12, 1956), pages 115 to 120. Pages 117 to 119 relied on.